(12) United States Patent
Hoshen et al.

(10) Patent No.: US 8,418,216 B2
(45) Date of Patent: Apr. 9, 2013

(54) FORECASTING AND CABLE TELEVISION NETWORK—PLANNING OF NARROWCAST SERVICES

(75) Inventors: Amotz Hoshen, Tel Aviv (IL); Alon Shafrir, Kfar Saba (IL); Omer Rotem, Tel Aviv (IL)

(73) Assignee: ARRIS Solutions, Inc., Suwanee, GA (US)

( * ) Notice: Subject to any disclaimer, the term of this patent is extended or adjusted under 35 U.S.C. 154(b) by 132 days.

(21) Appl. No.: 13/118,482

(22) Filed: May 30, 2011

(65) Prior Publication Data

US 2011/0321078 A1 Dec. 29, 2011

Related U.S. Application Data

(60) Provisional application No. 61/349,863, filed on May 30, 2010.

(51) Int. Cl.
*H04N 7/173* (2006.01)
(52) U.S. Cl.
USPC ............. 725/107; 725/93; 725/116; 725/146; 717/104; 717/105; 717/124; 717/125; 717/134; 717/135; 715/771
(58) Field of Classification Search ..................... 725/93, 725/107, 116, 146; 717/104–105, 124–125; 717/134–135; 715/771
See application file for complete search history.

(56) References Cited

U.S. PATENT DOCUMENTS

| | | | | |
|---|---|---|---|---|
| 5,842,199 A | * | 11/1998 | Miller et al. | 1/1 |
| 7,058,559 B1 | * | 6/2006 | Roeck et al. | 703/21 |
| 8,307,392 B2 | * | 11/2012 | Ahanger et al. | 725/36 |
| 2003/0037331 A1 | * | 2/2003 | Lee | 725/32 |
| 2004/0025183 A1 | * | 2/2004 | Wittig | 725/90 |
| 2006/0101495 A1 | * | 5/2006 | Yoshida et al. | 725/78 |
| 2011/0126244 A1 | * | 5/2011 | Hasek | 725/87 |
| 2011/0179443 A1 | * | 7/2011 | Calzone | 725/28 |
| 2011/0307913 A1 | * | 12/2011 | Wang et al. | 725/9 |

* cited by examiner

*Primary Examiner* — Jason Salce
(74) *Attorney, Agent, or Firm* — Troy A. Van Aacken; Robert J. Starr (57) ABSTRACT

A method and a non-transitory computer readable medium for evaluating a configuration change of a cable television network, the method may include: receiving, a model of a cable television network, the cable television network comprises multiple service groups, multiple transmitters and at least one session management unit; wherein each service group comprises multiple user devices; receiving or generating, viewers' activity information about viewing patterns of viewers that belong to the multiple service groups; receiving a request to perform a requested change in a current configuration of the cable television network; simulating, by a simulator, based on the model, the viewers' activity information and the requested change, a provision of services to the multiple service groups given the requested change to provide simulation results that represent an effect of the requested change, prior to a deployment of the change in the cable television network.

20 Claims, 6 Drawing Sheets

FORECASTING AND CABLE TELEVISION NETWORK—PLANNING OF NARROWCAST SERVICES

RELATED APPLICATIONS

This application claims priority of U.S. provisional patent Ser. No. 61/349,863 filing date May 30, 2010, which is incorporated herein by reference.

BACKGROUND OF THE INVENTION

Cable television network operators nowadays are making changes on a regular basis (e.g. adding new services). More services implies need for more cable television network-bandwidth and in practice, much of the additional bandwidth is required for "Narrowcast" services solutions such as Switched Digital Video (SDV), Video On Demand (VoD), and Time Shifted Television (TSTV).

Unlike broadcast, with narrowcast, the bandwidth consumption depends not only on the content-encoding, but also on activity patterns of viewers that watch the new content. For example, new content that is rarely watched has little effect on narrowcast bandwidth resources while popular new content has a major effect.

Changes like adding a new service often requires cable television network changes as well (e.g. addition of Quadrature Amplitude Modulation (QAM) modulators, splitting service-groups etc.)

One of the problems with narrowcast is that prior to the deployment of the change, it is hard to predict what would be the effect on narrowcast bandwidth usage. For example, until the deployment of new content it is hard to tell when it will be watched, what will be the concurrency, and as such how much additional bandwidth (BW) it will require.

If an operator deploys a change that requires much more BW, the result would be BW shortage resulting in bad service. Low service level due to BW shortage may include too high denial-of-service rate (e.g. cannot open TSTV or VoD session or cannot tune into an SDV channel), high latency of services responding to subscribers' actions (e.g. slow channel-change response, slow download), low video quality, etc.

The task of cable television network planning for such additions is therefore not an easy one and today cable television network operators are forced to work in baby-steps, implementing small changes, that should work with large safety margins and analyzing their real impact a few days afterwards. Implementing changes in such small steps is costly as well as slow.

Furthermore, many narrowcast solutions are much more BW efficient when used and configured optimally and are not beneficial if used incorrectly. If, for example, most popular services are delivered through SDV, operator gets no benefit from SDV solution. However, configuring narrowcast cable television network services correctly is not trivial. Currently, operators do not have an established means to optimize configuration (for example, select the most suitable programs to be delivered on the SDV tier, or optimal proper service-group size for narrowcast solutions). Therefore, some less-than-optimal settings are typically used and, as a result, the narrowcast solution efficiency is harmed.

There are prior-art solutions that monitor existing BW utilization in Cable Television (CATV) narrowcast applications. There are no known solutions that help estimate how a given change would impact BW utilization, or to optimally configure the network There is, therefore, a need for systems and methods for forecasting and cable television network-planning of narrowcast services.

SUMMARY

According to an embodiment of the invention a method may be provided and may include receiving a model of a cable television network, the cable television network comprises multiple service groups, multiple transmitters and at least one session management unit; wherein each service group comprises multiple user devices; receiving or generating, viewers' activity information about viewing patterns of viewers that belong to the multiple service groups; receiving a request to perform a requested change in a current configuration of the cable television network; simulating, by a simulator, based on the model, the viewers' activity information and the requested change, a provision of services to the multiple service groups given the requested change to provide simulation results that represent the effect of the requested change, prior to a deployment of the change in the cable television network.

The method may include generating viewers' activity information by processing raw viewers' activity information.

The method may include processing raw viewers' activity information to provide cable television statistics and service group statistics per each service group of the multiple service groups.

The method may include receiving a requested change in the number of transmitters (such as QAM transmitters) of the cable television network, and providing simulation results that represent the effect of the requested change in the number of transmitters of the cable television network.

The method may include receiving a requested change in a partition between broadcast services and switched digital video services; and providing simulation results that represent the effect of the requested change in the partition between broadcast services and switched digital video services.

The method may include receiving a requested change in mapping between service groups and user devices; and providing simulation results that represent an affect of the requested change in the mapping between service groups and user devices.

The method may include receiving a requested change in at least one bit rate allocated to at least one service that should be provided over the cable television network; and providing simulation results that represent the effect of the requested change in at least one bit rate allocated to at least one service that should be provided over the cable television network.

The method may include receiving a requested change of moving at least one service from broadcast services to narrowcast services that are currently expected to be provided over the cable television network; and providing simulation results that represent the effect of the requested change of moving at least one service to narrowcast services that are currently provided over the cable television network.

The method may include receiving a requested change of adding a new service to services that are currently provided over the cable television network; wherein the new service is expected to generate new viewing patterns having a similarity to viewing patterns of a currently provided reference service that are included in the viewers' activity information; and providing simulation results that represent the effect of adding the new service; wherein the simulation is responsive to the similarity between the viewing patterns.

The method may include receiving a requested change in the resolution of a service that is currently expected to be provided over the cable television network; and providing simulation results that represent the effect of adding the new service; wherein the change in the resolution comprises a change from a standard definition resolution to a high definition resolution.

The method may include receiving a requested change in the dimensionality of a service that is currently expected to be provided over the cable television network; and providing simulation results that represent the effect of adding the new service; wherein the change in the dimensionality comprises a change from a standard 2-dimension (2D) to 3-dimension (3D) service.

The method may include receiving a requested change in a delivery method (for example—broadcast or narrowcast) of at least one service that should be provided over the cable television network; and providing simulation results that represent the effect of the requested change in the delivery method of at least one service that should be provided over the cable television network.

A method for determining a network configuration a cable television network may be provided and may include: receiving or generating viewers' activity information about viewing patterns of viewers that belong to the multiple service groups; receiving a request to locate a configuration of the cable television network that will comply with a requested performance related demand; evaluating a plurality of configurations of the cable television network until finding at least one desired configuration of the cable television network that satisfies the requested performance related demand; wherein an evaluating of each configuration of the cable television network out of the plurality of configurations of the cable television network comprises: generating a model of the cable television network when configured according to the configuration; wherein the cable television network comprises multiple service groups, multiple transmitters and at least one session management unit; wherein each service group comprises multiple user devices; simulating, by a simulator, a provision of services to the multiple service groups by the cable television network to provide simulation results that represent a compliance level of the cable television to the requested performance related demand.

The method may include processing raw viewers' activity information to provide cable television statistics and service group statistics per each service group of the multiple service groups.

The method may include finding multiple desired configuration of the cable television network that satisfy the requested performance related demand and selecting a selected desired configuration of the cable television network.

The requested performance related demand may relate to an allowable number (or rate) of denials of service requests sent to user devices of the cable television network.

The requested performance related demand may relate to a minimal number of transmitters required for providing services to the user devices without exceeding an allowable number of denials of service requests.

The requested performance related demand may relate to a partition between broadcast services and switched digital video services and an allowable number (or rate) of denials of service requests.

The requested performance related demand may relate to a quality of service level supported by the cable television network.

A non-transitory computer readable medium may be provided and may include instructions for receiving a model of a cable television network, the cable television network comprises multiple service groups, multiple transmitters and at least one session management unit; wherein each service group comprises multiple user devices; receiving or generating, viewers' activity information about viewing patterns of viewers that belong to the multiple service groups; receiving a request to perform a requested change in a current configuration of the cable television network; simulating, by a simulator, based on the model, the viewers' activity information and the requested change, a provision of services to the multiple service groups given the requested change to provide simulation results that represent an effect of the requested change, prior to a deployment of the change in the cable television network.

A non-transitory computer readable medium may be provided and may include instructions for receiving or generating viewers' activity information about viewing patterns of viewers that belong to the multiple service groups; receiving a request to locate a configuration of the cable television network that will comply with a requested performance related demand; evaluating a plurality of configurations of the cable television network until finding at least one desired configuration of the cable television network that satisfies the requested performance related demand; wherein an evaluating of each configuration of the cable television network out of the plurality of configurations of the cable television network comprises: generating a model of the cable television network when configured according to the configuration; wherein the cable television network comprises multiple service groups, multiple transmitters and at least one session management unit; wherein each service group comprises multiple user devices; simulating, by a simulator, a provision of services to the multiple service groups by the cable television network to provide simulation results that represent a compliance level of the cable television to the requested performance related demand.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The term "viewers' activity information" can include information about viewing patterns of viewers that belong to one or more service groups. It can be arranged in various formats, stored in one or more databases and include raw viewers' activity information, processed viewers' activity information and the like. It can be stored in logs, can be represented by various attributes and the like. Non-limiting examples of attributes are explained in relation to some of the following figures and may include a viewership, a universal model and the like.

The term "service" may have its regular meaning and may also include a provision of transmitted content such as not limited to a linear service, a non-linear service, video on demand, switched broadcast, on-demand channels and the like. The term service may also be referred to as asset or session. A service can be provided during one or more sessions.

The terms "user", "viewer" and "subscriber" have the same meaning throughout the specification.

A configuration of a cable television network can include the components of the cable television network, the connectivity between the components, the services provided to the service groups, the manner in which services are provided (for example—broadcast or unicast, SD or HD services), decisions (algorithms) applied by session managers, mapping between user devices and service groups and the like.

According to various embodiments of the invention, the herein proposed solutions include some or all of the following:
a. Highly accurate automatic estimates for narrowcast BW utilization and service level given a planned cable television network configuration change (before actually deploying it).
b. Automatic statistical estimates for narrowcast BW utilization and service level given planned addition of new services, based on similarity to existing services.
c. Automatic choice of linear services that fit best into SDV narrowcast BW.
d. Automatic choice of cable television network configuration parameters to optimize cost of supporting a given set of services.

Figure 1:
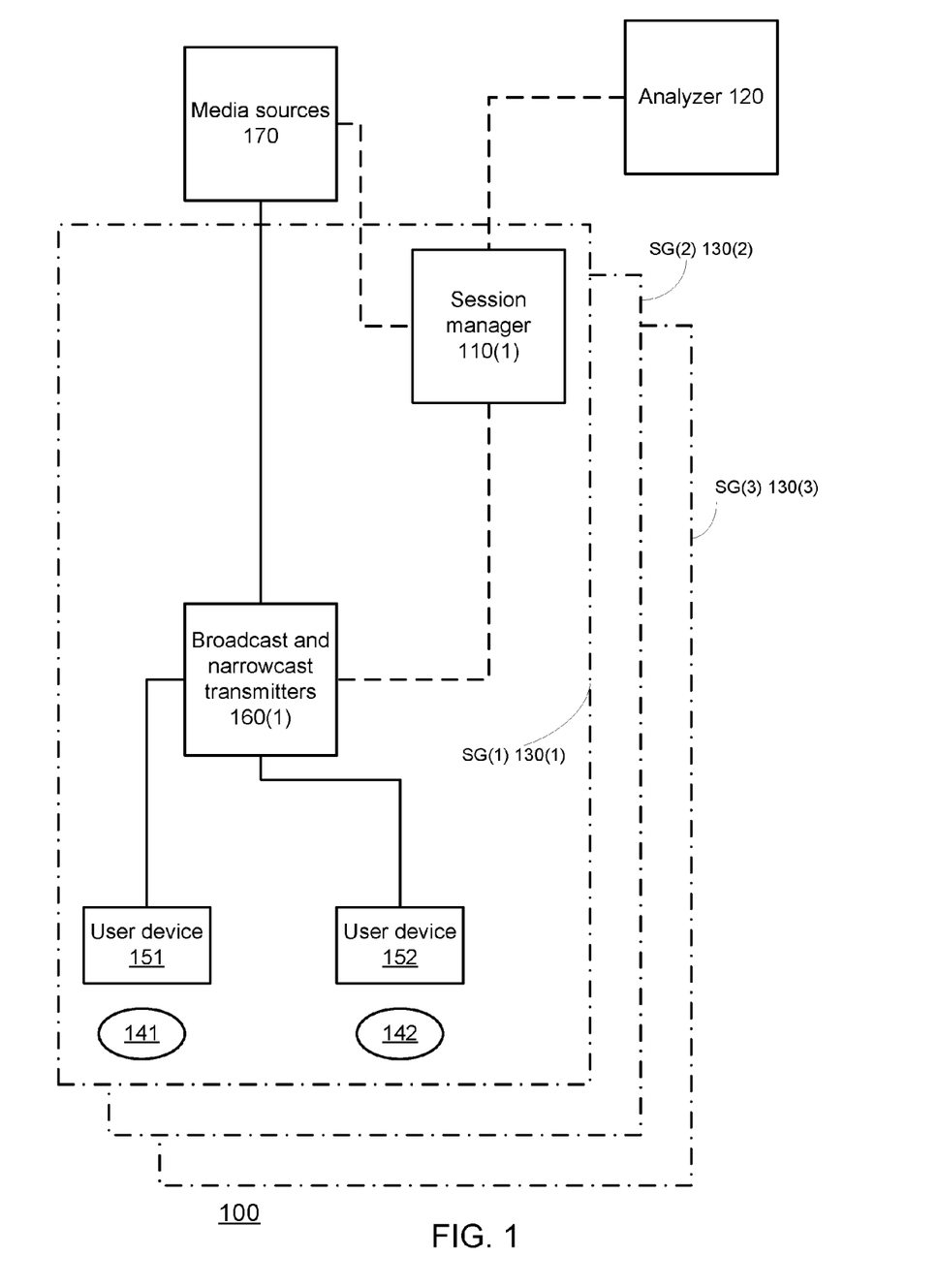
FIG. 1 illustrates a model for a CATV cable television network site with narrowcast services, according to an embodiment of the invention.

FIG. 1 illustrates a model of a CATV cable television network 100, according to an embodiment of the invention.

The CATV cable television network 100 includes at least one managing device (or devices) such as cable television network session manager and resource manager (hereinafter—management device) 110(1), that manages cable television network sessions and cable television network resources, for one or more service-group. FIG. 1 illustrates multiple (N) service groups 130(1)-130(N) and a single managing device 110(1). It is noted that a single management device can manage more than a single service group. In general there may be K different management devices, wherein K may range between 1 and N.

A service group can be connected to a media cable television network and can receive services provided from service/content sources 170 over one or more cable television network elements (such as broadcast and narrowcast transmitter 160). Service group 130(1) is illustrated as including two client devices 151 and 152 of two subscribers 141 and 142 but usually include much more than two user devices. It is noted that a subscriber can have more than a single user device that is part of a service group.

The management device 110(1) is conveniently configured to collect viewers' activity information. The management device 110(1) may collect viewers' activity information relating to the subscribers in various manners including polling, constant monitoring and the like.

The viewers' activity information can be sent "as is" or processed by the management device 110(1) and be sent to an analyzer 120 that may perform offline or online analysis. Activity information may include, for example, some or all of the events that may affect BW usage and per event, e.g.: time, event type (e.g. viewer started watching), viewer-identifier (ID), service-ID and the like.

It is noted that there may be more than a single analyzer in the model of the CATV cable television network 100.

The analyzer 120 can be configured to:
i. Build a viewership-database including past viewers-activity events (e.g. as defined above).
ii. Perform analysis calculations based on cable television network-configuration information and on viewers' activity database. Non-limiting examples of the analysis are provided below.

Figure 2:
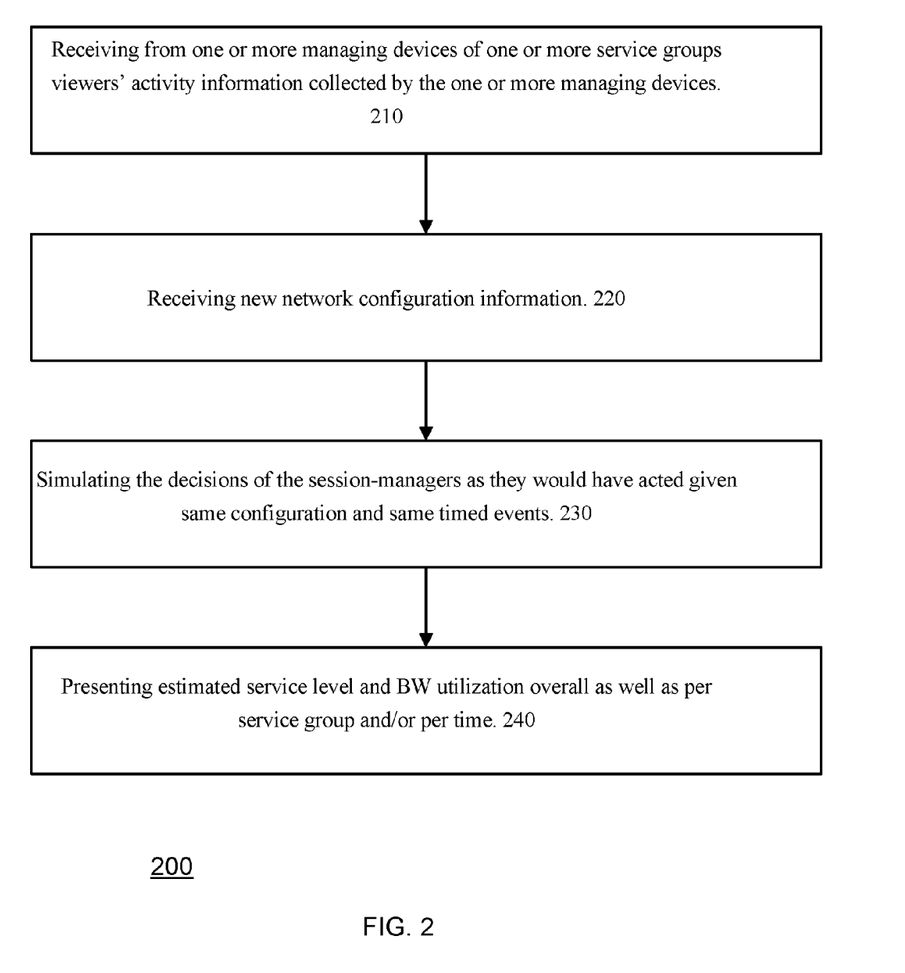
FIG. 2 illustrates a first method for estimating narrowcast BW utilization given a planned cable television network configuration change, according to an embodiment of the invention.

FIG. 2 illustrates a method 200 for estimating narrowcast BW utilization given a planned cable television network configuration change, according to an embodiment of the invention.

Method 200 may be carried out by an offline analysis device, such as analyzer 120 of FIG. 1.

Method 200 may start by stage 210 of receiving from one or more managing devices of one or more service groups viewers' activity information collected by one or more managing devices.

Stage 210 is followed by stage 220 of receiving new cable television network configuration information, which conveniently pertains to a new cable television network configuration planned. This can include, for example, a number of narrowcast services per service-group, a mapping of services to different delivery options (broadcast or narrowcast), resource-allocation policy parameters, grouping of HFC nodes to service-groups. Thus, stage 220 may be regarded as receiving a request to perform a requested change in a current configuration of the cable television network.

Stage 220 is followed by stage 230 of simulating decisions of the session-managers as they would have acted given same configuration and same timed events. Since all BW usage is controlled through these managers, the simulation can accurately estimate what would-have happened in the past if cable television network configuration were implemented per the new plan.

Such a simulation may keep track of BW usage of each service in each service-group at every moment and can produce statistics about maximum BW utilization, denial-of-service events etc. Besides an overall service-level estimate this also allows the operator to identify bottlenecks.

The simulation may be based on a modified model of the cable television network that takes into account the current configuration of the cable television network and the requested change in the configuration of the cable television network.

The simulation may include estimating requests to receive service from users of the service groups, decisions made by the session managers and the like.

The simulation may provide simulation results that may represent the effect of the requested change, prior to deployment of the change in the cable television network. This may include presenting estimated service level and bandwidth utilization overall as well as estimated service level and bandwidth utilization per service group—as illustrated by stage 240.

The simulation module may receive a table of SDV services and their BRs, viewership logs of users' activity, and network configuration parameters. The simulator then runs the same service allocation algorithm as is used by the operator in the field and produces results in the form of BW utilization, denial-of-service events per day or denial-of-service rate. The simulator can simulate a session manager and apply various algorithms such as but not limited to the algorithms illustrated in any of the following U.S. Pat. Nos. 7,471,639, 7,151,782 and 6,999,477 which are incorporated herein by reference.

The simulation may implement the same set of algorithms and decisions used in the field to allocate BW for SDV services on QAM channels to enable subscribers to watch the required service.

The algorithms for allocation policy include calculating real-time popularity score for each service, the probability of subscribers wanting to tune in to each service in the near future and stacking services (maybe of different BW) efficiently in a QAM channel.

The simulation can receive as input a lineup file containing service ID and BR (potentially other attributes), events log file reflecting subscribers' activities per SG (Tuning In/Out, KeepAlive messages etc.), available resources (QAMs) per SG, resource allocation policy/algorithm, and possible other network configuration and system parameters. The simulation can output rejection events (denial of service), rejection rate per day, miss events (subscriber tuning into an unallocated program), and necessary resources (QAMs) to ensure acceptable rejection rate (optional).

The following tables provide examples of (a) an input lineup file, (b) an input event file and (c) an output log file:

(a) Example of an input lineup to the SDV allocation simulator:

| Service ID | Name | BR |
|---|---|---|
| 1001 | CNN | 3750000 |
| 1002 | HBO | 3812500 |

-continued

| Service ID | Name | BR |
|---|---|---|
| 1003 | Fox Sport HD | 15000000 |
| ... | | |

(b) Example of an input event log to the SDV allocation simulator:

| Date/Time | Service ID | Viewers Before Sw | Viewers After Sw | Client ID | Status |
|---|---|---|---|---|---|
| 05-23-11 09:33:25.124 | 1003 | 16 | 15 | 1234567 | Switch |
| 05-23-11 09:33:25.124 | 1010 | 0 | 1 | 1234567 | Switch |
| 05-23-11 09:33:27.179 | 0 | 0 | 0 | 1111111 | KeepAlive |
| 05-23-11 09:34:31.213 | 1010 | 1 | 0 | 1234567 | Switch |
| 05-23-11 09:34:31.213 | 1001 | 21 | 22 | 1234567 | Switch |

(c) Example of an output of the SDV allocation simulator:

| Lineup Br | #INs | rejections | misses | QAMs | Peak Time | Peak BR | Peak services | Peak HD_ch | Peak viewers | seen STBs |
|---|---|---|---|---|---|---|---|---|---|---|
| 4.04E+09 | 196700 | 32 | 53186 | 24 | 39977.87 | 1.36E+09 | 130 | 77 | 200 | 638 |

Figure 3:
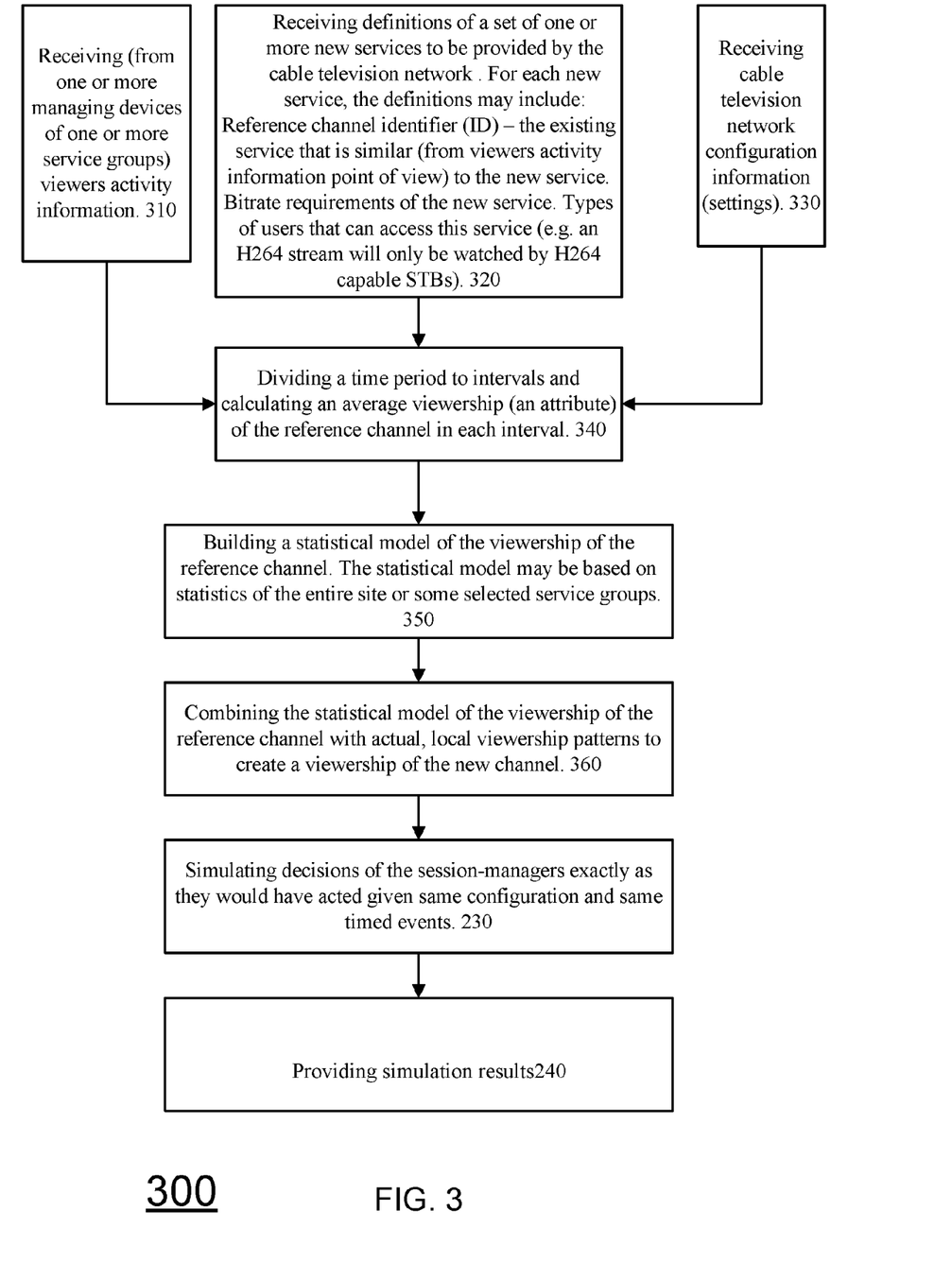
FIG. 3 illustrates a second method to forecast BW utilization given addition of new services, according to an embodiment of the invention.

FIG. 3 illustrates method 300 for forecasting BW utilization given addition of new services, according to an embodiment of the invention.

When a completely new service (may be a narrowcast channel or on-demand asset) is added, one has no viewers' activity information for it for that cable television network. In most cases, however, a new service is expected to have similar viewership pattern to those of another, already existing service.

A simplistic example is adding an HDTV channel with same content as an existing SDTV channel.

Method 300 may be carried out by an offline analysis device, such as analyzer 120 of FIG. 1.

Method 300 starts by stages 310, 320 and 330.

Stage 310 may include receiving (from one or more managing devices of one or more service groups) viewers' activity information.

Stage 320 may include receiving definitions of a set of one or more new services to be provided by the cable television network. For each new service, the definitions may include:

i. Reference service identifier (ID)—the existing service that is similar (from viewers' activity information point of view) to the new service.
ii. Bitrate requirements of the new service.
iii. Types of users that can access this service (e.g. an H264 stream will only be watched by H264 capable STBs)

Stage 330 may include receiving cable television network configuration information (settings).

Stages 310, 320 and 330 may be followed by stage 340 of dividing a time period to intervals and calculating an average viewership (an attribute) of the reference service in each interval.

Stage 340 may be followed by stage 350 of building a statistical model of the viewership of the reference service. The statistical model may be based on statistics of the entire site or some selected service groups.

Stage 350 may be followed by stage 360 of combining the statistical model of the viewership of the reference service with actual, local viewership patterns to create a viewership of the new service in a specific service group.

Stage 360 of combining may include calculating dispersion of the service-groups around the statistical model of the entire site, correlation and scale of the specific service-group to the network-wide model and deducing parameters for combination. Stage 360 may provide a pattern indicating how many viewers-minutes the new service will attract per service group (Service Group) per time-interval.

Stage 350 may be followed by stage 360 of generating a modified viewership-database based on collected database with the modifications (deleting/modifying/synthesizing events) needed to reflect the estimated viewership of the new service.

Stage 360 may be followed by stage 230 of simulating decisions of the session-managers exactly as they would have acted given same configuration and same timed events. Since all BW usage is controlled through these managers, the simulation may include—for example—estimating what would-have happened in the past if adding a new service such as a HDTV service with same TV shows as an existing SDTV service. It is noted that the simulation may include adding any new service—even a service that has content that differs from those of the reference service.

The simulation may provide simulation results that may represent the effect of adding a new service to the SDV lineup prior to its actual addition. This may include presenting estimated service level and bandwidth utilization overall as well as estimated service level and bandwidth utilization per service group—as illustrated by stage 240.

Figure 4:
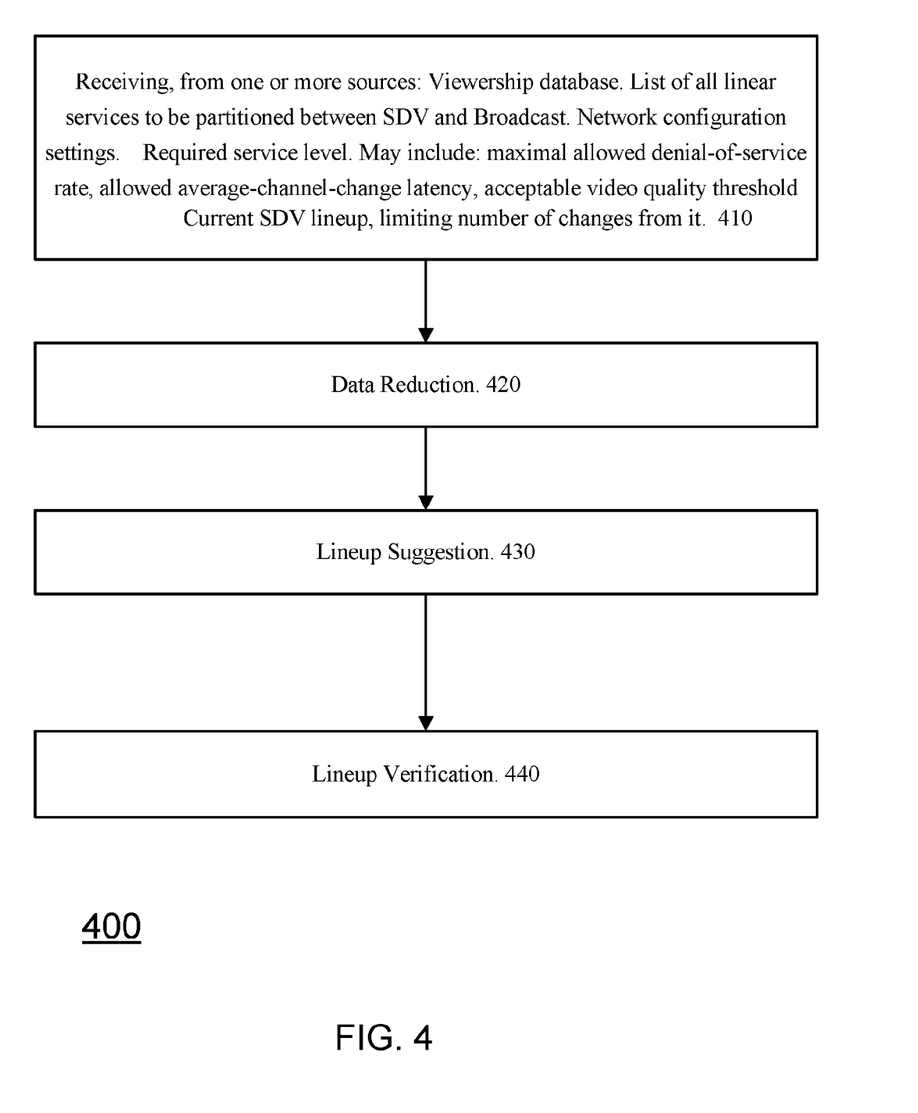
FIG. 4 illustrates a third method for automatic choice of linear services that fit best into SDV BW resources, according to an embodiment of the invention.

FIG. 4 illustrates a method 400 for an automatic choice of linear services that fit best into SDV BW resources, according to an embodiment of the invention. Method 400 may be carried out by an offline analysis device, such as the one disclosed in relation to FIG. 1.

The method 400 may start by stage 410 of receiving, from one or more sources, a viewership database, and cable television network configurations (for example a list of all linear services to be partitioned between SDV and broadcast) and requested performance related demands such as a required service level (for example, a maximal allowed denial-of-service rate, an allowed average channel-change latency, an acceptable video quality threshold and the like), a limitation on a number of deviations from the current configuration of the cable television network.

Stage 410 may be followed by stage 420 of performing data reduction in which a single point represents the viewership in a time period. This point is the peak viewership point within the aforementioned time period.

Stage 420 of data reduction may be applied in order to reduce the amount of information to be processed during stages 430 and 440.

A system input may be the viewership database, representing each subscriber's channel-change events (or each service group channel change events) throughout a time period. A typical cable television network can service hundreds of thousands of subscribers.

For this reason, stage 420 may be applied to reduce the amount of data to a manageable, more compact dataset which represents the important part of the entire database (during peak-time viewership).

Stage 420 can utilize the nature of viewership data. There are statistical dependencies between viewership data in adjacent points in time in same SG (service group), and also between SGs.

The data reduction may include aggregation of viewership data to represent a certain area in the whole sample-space time slot by a single point which represents BW requirements in that area. The aggregation function/choice of the sample point should be designed so that when later stages use it, it gives a high probability that resulting lineup will satisfy service level criteria. For example, if a service level criterion is about behavior when BW usage is maximal, aggregation function should be MAX. Aggregation may also be non-uniform, in time and space, providing denser sampling in areas that are more probably to be dominant in the optimization process.

Stage 420 is followed by stage 430 of suggesting a configuration of the cable television services tier. The configuration may also be referred to as lineup and stage 430 may be referred to as lineup suggestion.

Stage 430 of lineup suggestion may use the reduced viewership dataset, and identify the channels which should be delivered in narrowcast (by SDV).

Stage 430 may take into account the desired number of narrowcast allocated physical QAM channels, the partition of the site to Service-Groups, and the desired service level (e.g. maximal rate of denial of service events due to missing BW) set by the operator of the cable television network.

Stage 430 can receive an input from an operator—that may explicitly mark channel or a group of channels to be narrowcast provided or be broadcast. This input may be taken into account during stage 430.

Stage 430 may be done iteratively, where each iteration may use dynamic programming to find largest set of narrowcast services that can fit together within the available BW and QAM channels. Iterations may be used to prevent local minima and perform re-sampling of the sample space to have the reduced input data best represent BW usage given the lineup to be output. To avoid over-fitting, this may be done only on part of the period of available viewership information (the whole data may be used later in the verification stage 440) and reserving an unused amount of QAMs-BW to act as safety margin for events not covered in used viewership period.

Stage 430 is followed by stage 440 of verifying the suggested lineup configuration ("lineup verification").

Stage 440 can include verifying the suggested configuration using stages 230 and 240—simulating the suggested configuration and evaluating the outcome of the evaluation—providing the simulation results.

Based on simulation results, stage 440 can also slightly tune the recommended configuration according to the result of the specific simulation. For example, stage 440 may suggest removing a service from being narrowcast transmitted (from being included in a SDV lineup) if simulated service level was too low or BW utilization was not leaving enough safety margin. Stage 440 may use information that may not be taken into account during stage 430.

The output of stage 440 may provide a recommended configuration—and especially the services that should be narrowcast (be included in a SDV lineup) and provide forecasted metrics of BW utilization/service-level if this SDV lineup was deployed.

Figure 5:
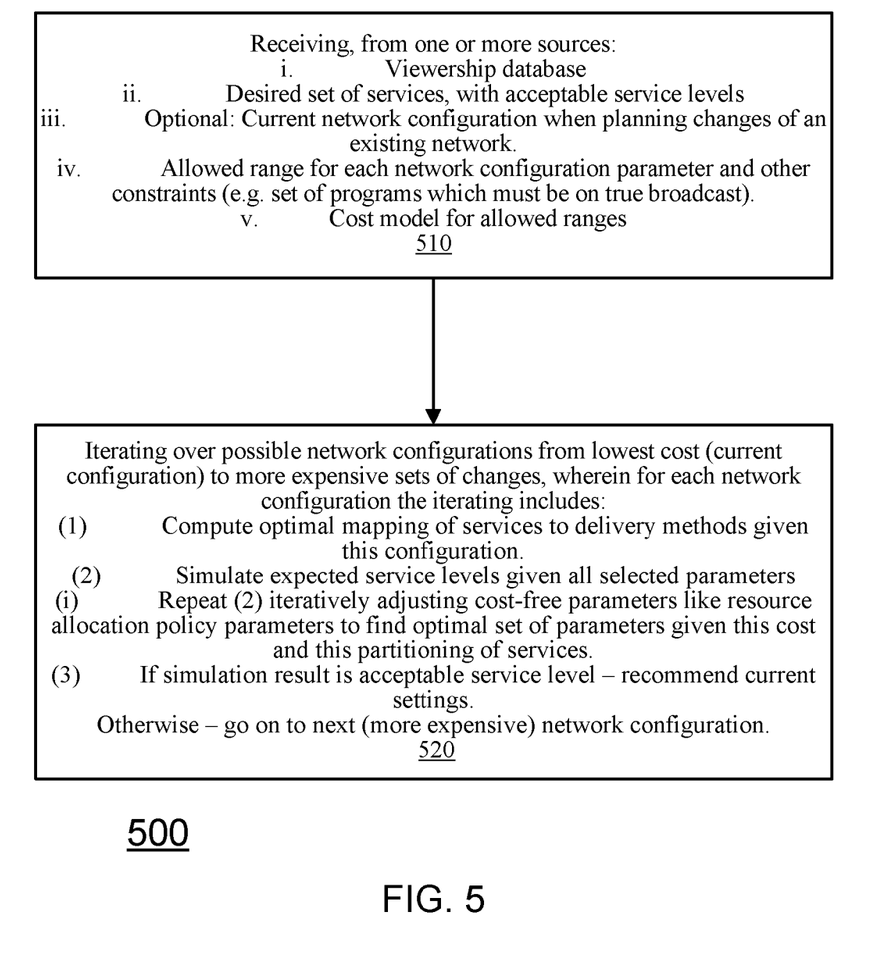
FIG. 5 illustrates a fourth method for automatic choice of cable television network configuration parameters for delivering given services with optimal costs, according to an embodiment of the invention.

FIG. 5 illustrates method 500 for automatic choice of cable television network configuration parameters for delivering given services with optimal costs, according to an embodiment of the invention.

Method 500 may be carried out by an offline analysis device, such as analyzer 120 of FIG. 1.

Method 500 may start by stage 510 of receiving, from one or more sources, at least some of the following:
 i. Viewership database
 ii. Desired set of services, with acceptable service levels
 iii. Current cable television network configuration when planning changes of an existing cable television network.
 iv. Allowed range for each cable television network configuration parameter (e.g. number of narrowcast QAMs per service group may be within 4-16, service group size may be 500-2000 tuners, etc.) and other constraints (e.g. set of programs which must be on true broadcast).
 v. Cost model for allowed ranges:
  1. In case of modification based on existing cable television network, cost per modification of cable television network configuration (e.g. cost of service group split or cost of adding one narrowcast QAM to all service groups).
  2. Cost model for the allowed range of each parameter (e.g. cost per QAM). Some parameters may have no cost implications (e.g. software policy parameters).

Stage 510 may be followed by stage 520 of iterating over possible cable television network configurations from lowest cost (current configuration) to more expensive sets of changes wherein for each cable television network configuration the iterating includes:
 i. Computing an optimal mapping of services to delivery methods given this configuration,
 ii. Simulating expected service levels given all selected parameters received during stage 510 and assuming the optimal mapping of services to delivery methods given the configuration. The simulation may be repeated for different cost-free parameters like resource allocation policy parameters to find optimal set of parameters given this cost and this partitioning of services. Thus providing simulation results.
 iii. If a simulation result relating to a certain configuration is of an acceptable service level—the iterations may stop. Else—another iteration of recommended current settings. Otherwise—go on to next (more expensive) cable television network configuration.

Figure 6:
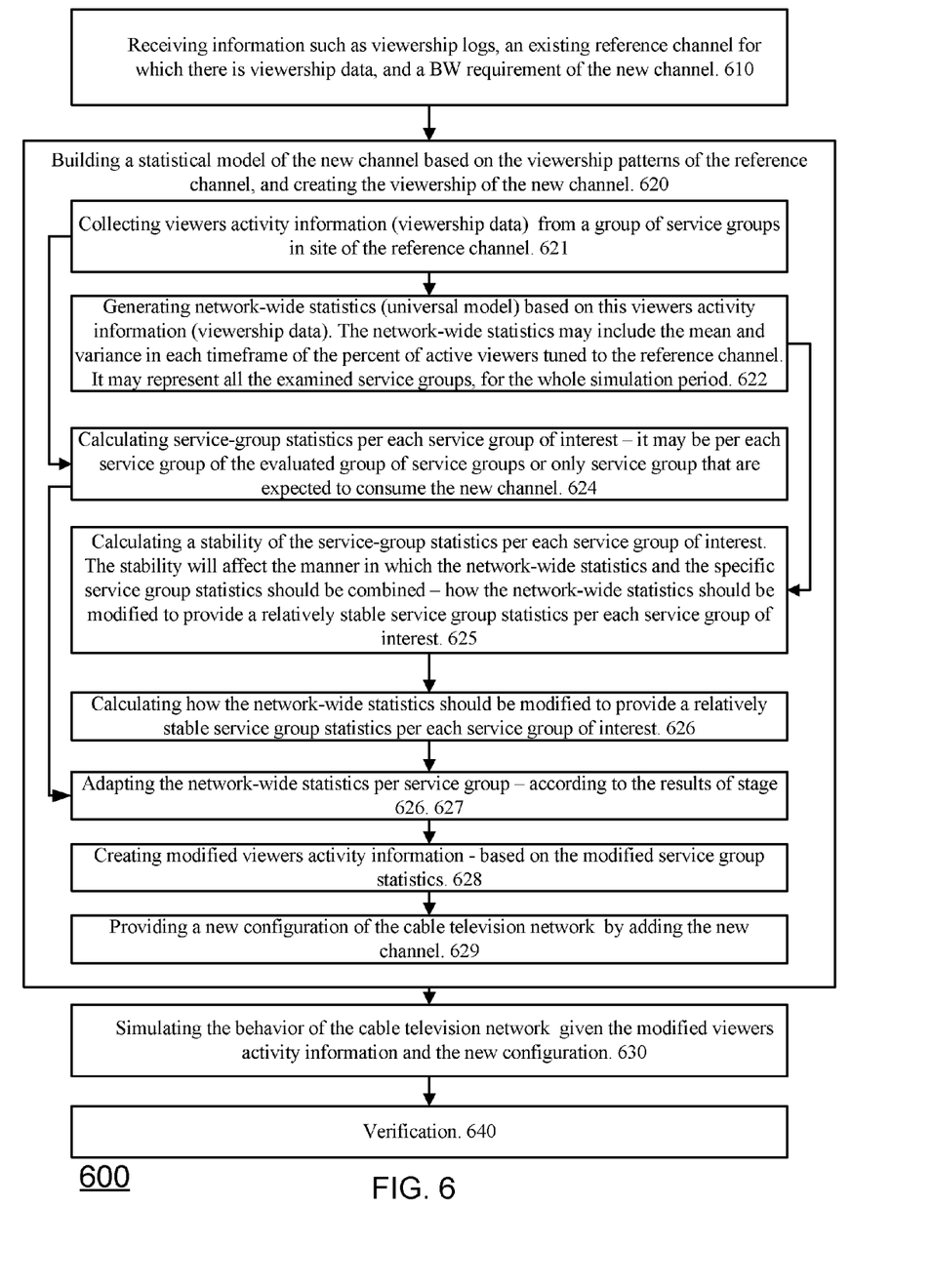
FIG. 6 illustrates a method according to an embodiment of the invention.

FIG. 6 illustrates a method 600 for simulating a new service according to an embodiment of the invention.

According to an embodiment of the invention a method may be provided for evaluating the effect of adding a new service to be supported by the cable television network. The new service (Referred to as new service) can be "similar" to an existing service (reference service) or can be a High Definition (HD) version of an existing Standard Definition (SD) service.

It is noted that simulation of a HD version of an existing SD service enables the customer to predict current (or future) system behavior if such service existed. Also, it enables the simulation of longer-term plans for both higher HD-tuners penetration and additional HD services.

Method 600 may start by an initializing stage 610 of receiving information such as viewership logs, an existing reference service for which there is viewership data, and a BW requirement of the new service.

Stage 610 may include receiving as input: simulation start and end times, viewers' activity information such as viewer information logs, selection information about which service groups to analyze, reference service identifier (for example— one reference service for each new service), new service BW requirements, and an attribute indicating if the new service is an HD version of an existing service.

Stage 610 may be followed by stage 620 of building a statistical model of the new service based on the viewership patterns of the reference service, and creating the viewership of the new service.

A network-wide statistics can be obtained by processing viewers' activity information obtained from the entire cable television network or from a large amount (for example 50) service groups. This network-wide statistics may include normalized mean and variance viewership. The network-wide statistics can be adapted to the specific service group under simulation (may of course be applied to the whole site or part of) by considering the local viewership pattern of the reference service in the specific service group.

The viewers' activity information may be collected from the reference service over intervals of predefined duration such as but not limited to 30 minutes. For each such interval the average number of viewers is obtained.

Stage 620 can include at least one of stages 621, 622, 624, 625, 626, 627, 628 and 629.

Stage 621 can be followed by stage 622. Stage 622 may be followed by stage 624. Stage 624 may be followed by stage 625. Stage 625 may be followed by stage 626. Stage 626 may be followed by stage 627. Stage 627 may be followed by stage 628. Stage 628 may be followed by stage 629.

Stage 621 may include collecting viewers' activity information (viewership data) from a group of service groups in site of the reference service.

Stage 621 may include going over service group logs and for each service group, at each predefined duration period, calculating service-group statistics that may include an average viewership of each service, indicative of a number of viewers that viewed the service and of a duration of the viewing of each service by the viewers.

This calculation can be done for the entire duration of the desired simulation, for each service.

Stage 621 can be done periodically offline so that it can be provided to a user when the user wants to execute method 600. Since the selection of a reference service (by the operator) is not known in advance, stage 621 can be executed for all services.

The outcome of stage 621 can have many formats, such as those illustrated in the following table. The values in the table are average viewership of each service for each predetermined period. A column is allocated per service.

| | serviceID | | | | | | |
|---|---|---|---|---|---|---|---|
| Timeframe | 1001 | 1002 | 1003 | 1004 | 1005 | ... | 8200 |
| 1st period | 1.23 | 0 | | | | | |
| 2nd period | 2.7 | 0 | | | | | |
| 3rd period | 12.0 | 0.6 | | | | | |
| ... | 13.5 | 0.8 | | | | | |
| 700th period | 9.5 | 0.5 | | | | | |

Stage 622 may include generating network-wide statistics (universal model) based on this viewers' activity information (viewership data). The network-wide statistics may include the mean and variance in each timeframe of the percent of active viewers tuned to the reference service. It may represent all the examined service groups, for the whole simulation period.

Stage 622 may include calculating the network-wide statistics (such as mean and variance). This may include normalizing the network-wide statistics to the maximal number of actual viewers seen at each point of time in each service group.

Stage 624 may include calculating service-group statistics per each service group of interest—it may be per each service group of the evaluated group of service groups or only service group that are expected to consume the new service.

Stage 625 includes calculating a stability of the service-group statistics per each service group of interest. The stability will affect the manner in which the network-wide statistics and the specific service group statistics should be combined—how the network-wide statistics should be modified to provide a relatively stable service group statistics per each service group of interest.

Stage 625 may include calculating a parameter 'beta' as a relationship (for example—ratio) between the variance and mean of the service-group statistics.

Stage 626 may include calculating how the network-wide statistics should be modified to provide a relatively stable service group statistics per each service group of interest.

Stage 626 may include calculating a parameter 'alpha' as a function of 'beta'. 'Alpha' can increase as 'beta' increases, although the mapping between 'alpha' and 'beta' can be linear or non-linear. A look up table can be used to store the mapping.

Stage 627 may include adapting the network-wide statistics per service group—according to the results of stage 626.

Stage 627 may include calculating modified viewers' activity information $$AUM(sg)=\alpha \cdot (\text{Viewership}_{service\ group}[t])+(1-\alpha)\cdot \text{Viewership}_{Universal\ Model(mean)}[t]$$

Stage 628 may include creating modified viewers' activity information—based on the modified service group statistics.

Stage 628 may include modifying the service group logs to contain viewership of the new service.

Stage 628 may include creating actual viewership for the new service in the service group logs by inventing new factitious viewers.

Stage 628 may include finding out how many tuners should be tuned to the new service. If the number of viewers that are expected to view the new service exceeds a threshold then there may be a need to introduce new viewers in the simulation. The thresholds can be a predefined fraction of the maximal number of viewers of a service group that can view a service (for example—HD service related to viewers that have HD-capable user devices).

Stage 629 may include providing a new configuration of the cable television network by adding the new service or services.

Stage 620 may be followed by stage 630 of simulating the behavior of the cable television network given the modified viewers' activity information and the new configuration.

Stage 629 may include adding the new service ID and BW requirements to the existing lineup.

It is noted that implementing the aforementioned system and/or one or more of the aforementioned methods may have various functionalities. Some of those functionalities are discussed below.

It is noted that this discussion does not exhaust the functionalities that may be enabled in various embodiments of the invention.

The methods, computer readable mediums and systems disclosed in the specification may enable a highly accurate BW usage estimates for planned/considered cable television network modifications. They may provide the equivalent of "deploying and monitoring for a month" by a few hours of offline computations. This can be contributed to the using of existing viewers' activity information, implementing an offline simulation that may perfectly imitate what cable television network session manager and resource manager would do and feeds it with timed viewership events.

The methods, computer readable mediums and systems disclosed in the specification may enable planning several significant cable television network changes at once with less risk.

The methods, computer readable mediums and systems disclosed in the specification may enable a cable television network planning for adding new services, allowing larger and faster changes with fewer risks. This can be contributed to: usage of the similarity between services, regardless of the current delivery method of each service, averaging viewership over time intervals, building a statistical viewership model based on the entire site and combining and adapting network-wide model per service-group.

The methods, computer readable mediums and systems disclosed in the specification may enable an excellent forecasting for the impact of adding a new version of an existing service (e.g. HD version for existing SD, 3D version for existing game, etc) or a totally new service which is expected to be similar to an already existing service.

The methods, computer readable mediums and systems disclosed in the specification may enable an optimization of cable television network BW efficiency, by optimal partition of services to delivery methods. This can be contributed to reducing viewership activity database to a far smaller dataset that still captures BW bottlenecks, using dynamic programming for building lineup, automatically simulating options and iteratively improving them.

The methods, computer readable mediums and systems disclosed in the specification may enable affordable maintenance by recommending a few changes to improve efficiency with relation to current configuration.

The methods, computer readable mediums and systems disclosed in the specification may enable a holistic optimization of cable television network efficiency for multiple types of services.

The methods, computer readable mediums and systems disclosed in the specification may enable cost-optimization of cable television network deployment or cable television network upgrades, while constrained to a set of service-level criteria.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for evaluating a configuration change of a cable television network, the method comprising:
receiving, a model of a cable television network, the cable television network comprises multiple service groups, multiple transmitters and at least one session management unit; wherein each service group comprises multiple user devices; wherein user devices are mapped to nodes and nodes are mapped to service groups.
receiving or generating, viewers' activity information about viewing patterns of viewers that belong to the multiple service groups;
receiving a request to perform a requested change in a current configuration of the cable television network;
simulating, by a simulator, based on the model, the viewers' activity information and the requested change, a provision of services to the multiple service groups given the requested change to provide simulation results that represent an effect of the requested change, prior to a deployment of the change in the cable television network.

2. The method according to claim 1, comprising generating viewers' activity information by processing raw viewers' activity information.

3. The method according to claim 2, comprising processing raw viewers' activity information to provide cable television statistics and service group statistics per each service group of the multiple service groups.

4. The method according to claim 1, comprising receiving a requested change in the number of transmitters of the cable television network, and providing simulation results that represent the effect of the requested change in the number of transmitters of the cable television network.

5. The method according to claim 1, comprising receiving a requested change in the partition between broadcast services and switched digital video services; and providing simulation results that represent the effect of the requested change in the partition between broadcast services and switched digital video services.

6. The method according to claim 1, comprising receiving a requested change in the mapping between service groups and user devices; and providing simulation results that represent the effect of the requested change in the mapping between service groups and user devices.

7. The method according to claim 1, comprising receiving a requested change in at least one bit rate allocated to at least one service that should be provided over the SDV cable television network; and providing simulation results that represent an affect of the requested change in at least one bit rate allocated to at least one service that should be provided over the SDV cable television network.

8. The method according to claim 1, comprising receiving a requested change of adding at least one narrowcast service to the services that are currently expected to be provided over the cable television network; and providing simulation results that represent the effect of the requested change of adding at least one narrowcast service to services that are currently provided over the cable television network.

9. The method according to claim 1, comprising receiving a requested change of adding a new narrowcast service to services that are currently provided over the cable television network; wherein the new service is expected to generate new viewing patterns having a similarity to viewing patterns of a currently provided reference service; and providing simulation results that represent the effect of adding the new service; wherein the simulation is responsive to the similarity between the new viewing patterns and the viewing patterns of the currently provided reference service.

10. The method according to claim 1, comprising receiving a requested change in resolution of a narrowcast service that is currently expected to be provided over the cable television network; and providing simulation results that represent the effect of the resolution change; wherein the change in the resolution comprises a change from a standard definition resolution to a high definition resolution, from a standard definition to 3D or from a high definition to 3D.

11. The method according to claim 1, comprising receiving a requested change in a delivery method of at least one service that should be provided over the cable television network; and providing simulation results that represent the effect of the requested change in the delivery method of at least one service that should be provided over the cable television network.

12. A method for determining an optimal configuration of a cable television network, the method comprising:
receiving or generating viewers' activity information about viewing patterns of viewers that belong to the multiple service groups;
receiving a request to locate a configuration of the cable television network that will comply with a requested performance related demand;
evaluating a plurality of configurations of the cable television network until finding at least one desired configuration of the cable television network that satisfies the requested performance related demand;
wherein an evaluating of each configuration of the cable television network out of the plurality of configurations of the cable television network comprises:
generating a model of the cable television network when configured according to the configuration; wherein the cable television network comprises multiple service groups, multiple transmitters and at least one session management unit; wherein each service group comprises multiple user devices;
simulating, by a simulator, a provision of services to the multiple service groups by the cable television network to provide simulation results that represent a compliance level of the cable television to the requested performance related demand.

13. The method according to claim 12, comprising processing raw viewers' activity information to provide cable television statistics and service group statistics per each service group of the multiple service groups.

14. The method according to claim 12, comprising finding multiple desired configuration of the cable television network that satisfies the requested performance related demand and selecting a desired configuration of the cable television network.

15. The method according to claim 12, wherein the requested performance related demand relates to an allowable number of denials of service requests sent to user devices of the cable television network.

16. The method according to claim 12, wherein the requested performance related demand relates to a minimal number of transmitters required for providing services to the user devices without exceeding an allowable number of denials of service requests.

17. The method according to claim 12, wherein the requested performance related demand relates to a partition between broadcast services and switched digital video services and an allowable number of denials of service requests.

18. The method according to claim 12, wherein the requested performance related demand relates to a quality of service level supported by the cable television network.

19. A non-transitory computer readable medium that stores instructions for:
- receiving, a model of a cable television network, the cable television network comprises multiple service groups, multiple transmitters and at least one session management unit; wherein each service group comprises multiple user devices;
- receiving or generating, viewers' activity information about viewing patterns of viewers that belong to the multiple service groups;
- receiving a request to perform a requested change in a current configuration of the cable television network;
- simulating, by a simulator, based on the model, the viewers' activity information and the requested change, a provision of services to the multiple service groups given the requested change to provide simulation results that represent an effect of the requested change, prior to deployment of the change in the cable television network.

20. A non-transitory computer readable medium that stores instructions for:
- receiving or generating viewers' activity information about viewing patterns of viewers that belong to the multiple service groups;
- receiving a request to locate a configuration of the cable television network that will comply with a requested performance related demand;
- evaluating a plurality of configurations of the cable television network until finding at least one desired configuration of the cable television network that satisfies the requested performance related demand;
- wherein an evaluating of each configuration of the cable television network out of the plurality of configurations of the cable television network comprises:
  - generating a model of the cable television network when configured according to the configuration; wherein the cable television network comprises multiple service groups, multiple transmitters and at least one session management unit;
- wherein each service group comprises multiple user devices; and
- simulating, by a simulator, a provision of services to the multiple service groups by the cable television network to provide simulation results that represent a compliance level of the cable television to the requested performance related demand.

* * * * *